United States Patent [19]

Schonlau et al.

[11] Patent Number: 5,184,468
[45] Date of Patent: Feb. 9, 1993

[54] BRAKE POWER BOOSTER AND MASTER CYLINDER ASSEMBLY WITH RETURN SPRING PLATE

[76] Inventors: Juergen Schonlau, Steingartenweg 9, 6229 Walluf; Alfred Birkenbach, Kriemhildring 13a, 6234 Hattersheim 2; Ralf Harth, Schellbachstrasse 5, 6370 Oberursel/Ts, all of Fed. Rep. of Germany

[21] Appl. No.: 623,374
[22] PCT Filed: Jan. 25, 1990
[86] PCT No.: PCT/EP90/00134
  § 371 Date: Nov. 13, 1990
  § 102(e) Date: Nov. 13, 1990
[87] PCT Pub. No.: WO90/11215
  PCT Pub. Date: Oct. 4, 1990

[30] Foreign Application Priority Data
Mar. 17, 1989 [DE] Fed. Rep. of Germany ....... 3908805

[51] Int. Cl.$^5$ .................... B60T 13/52; B60T 13/57
[52] U.S. Cl. .................... 60/547.1; 60/589; 60/581; 60/535; 92/130 R; 92/98 D; 91/369.1
[58] Field of Search .............. 60/547.1, 547.2, 547.3, 60/548, 549, 550, 551, 552, 555, 560, 581, 589; 91/369.2, 369.4, 376 R

[56] References Cited

U.S. PATENT DOCUMENTS

| | | | |
|---|---|---|---|
| 1,982,449 | 11/1934 | Oliver | 60/581 |
| 2,074,361 | 3/1937 | Bowen | 60/581 |
| 2,458,803 | 1/1949 | Stelzer | 60/551 |
| 2,536,461 | 1/1951 | Price | 91/376 X |
| 3,059,435 | 10/1962 | Rusconi | 60/552 X |
| 3,222,869 | 12/1965 | Rockwell | 60/549 X |
| 3,327,804 | 6/1967 | Rike | 74/560 X |
| 3,543,298 | 11/1970 | Rockwell | 60/549 X |
| 3,688,501 | 9/1972 | Ellis, Jr. | 60/589 |
| 4,246,755 | 1/1981 | Weiler | 60/547.1 |
| 4,450,688 | 5/1984 | Boehm | 60/547.1 X |
| 4,455,829 | 6/1984 | Seip | 60/547.1 X |
| 4,469,008 | 9/1984 | Seki | 91/376 R |
| 4,481,865 | 11/1984 | Becht et al. | 60/547.1 X |
| 4,664,016 | 5/1987 | Tobisawa et al. | 91/376 R X |
| 4,884,403 | 12/1989 | Weber | 60/547.1 |

FOREIGN PATENT DOCUMENTS 0157951 8/1985 Japan ................... 91/369.2

Primary Examiner—Edward K. Look
Assistant Examiner—John Ryznic
Attorney, Agent, or Firm—Robert P. Seitter; J. Gordon Lewis

[57] ABSTRACT

A vacuum brake power booster is presented in which the vacuum control valve (81) is arranged parallel to the master cylinder (55). The housing (92) of the booster is used as a carrier element for actuating members, such as the brake pedal (60, 8) and the clutch pedal (11) as well as for other elements. A twin master cylinder is employed. A short overall axial length and a space-saving design of the assembly as a whole, enabling efficient incorporation of the overall assembly at the assembly line of the vehicle manufacturer, are achieved by the selection and arrangement of the components of the brake power booster and of the master cylinder, as well as of the actuating members.

46 Claims, 12 Drawing Sheets

BRAKE POWER BOOSTER AND MASTER CYLINDER ASSEMBLY WITH RETURN SPRING PLATE

TECHNICAL FIELD

The invention is related to a pneumatic brake power booster, preferably to a vacuum brake power booster, for fluid, in particular hydraulic, brake systems of automotive vehicles.

BACKGROUND OF THE INVENTION

Vacuum brake power boosters are devices which utilize the pressure gradient between the vacuum in the suction pipe of an Otto carburetor engine and the atmospheric ambient pressure as a source of power to boost the hydraulic pressure which is generated in the master cylinder by the foot effort of the driver.

A vacuum pump which is driven by the engine and which furnishes the required vacuum is used, as a rule, in two-stroke engines or Diesel engines.

Vacuum brake power devices of this kind are, among others, described in detail in the Brake Handbook by Alfred Teves GmbH, 8th edition, from page 94 onward.

From the German patent application published without examination, No. 29 35 286, a brake power booster for a vehicle brake unit is known. That booster includes a booster housing having a front and a rear housing wall, a pedal-actuated input member axially aligned with an output member, a movable wall sub-dividing the interior space of the housing into two chambers and suited to apply a force to the output member when the chambers are subjected to a pressure differential depending on the force exerted on the input member, and a power transmission device extending between the front housing wall and the rear housing wall and which, during operation, transmits braking reaction forces which would otherwise be transmitted by the housing.

In the forementioned German patent application published without examination, the power transmission device is provided with a pipe which is coaxial with the input member and with the output member and which extends through the movable wall.

Furthermore, a mechanically controlled brake device for an automotive vehicle is known which includes a master cylinder and a booster utilizing the pressure differential between a vacuum and the atmospheric pressure. The booster has a vacuum housing which includes a cup section and a cover section, a push rod which serves to initiate the braking action, and structure enabling fixation to a splash shield.

The structure for fixation is arranged in the vicinity of the master cylinder, preferably on that side of the cup section which faces the master cylinder.

In addition, FIG. 1 of U.S. Pat. No. 3,137,361 shows a brake power booster whose housing presents a bearing block for the brake pedal.

SUMMARY OF THE INVENTION

The present invention has the following objects, outlined below.

As a consequence of the sophisticated engine design of modern automotive vehicles and due to the more spacious passenger compartments of new models, the mounting space for brake power boosters becomes smaller and smaller.

Particular mounting problems are encountered with the axial extension of conventional assemblies which are comprised of a master cylinder, of a brake power booster, and of a brake pedal.

It is an object of the present invention to drastically reduce the mounting space requirements for brake power boosters and, in particular, to reduce the overall axial length.

In addition, it is an object of the present invention to create improved conditions for the automatic and efficient assembly of the brake power booster, of the brake pedal, of the clutch pedal, and of the clutch master cylinder in the vehicle. In particular, the complicated way of fitting the push rod in the passenger compartment which was necessary is avoided.

It is another object of the present invention to relieve the housing sections of the brake power booster of the well-known bending forces.

Another object of the invention is to reduce the weight of the brake power booster.

Moreover, suction noises in the passenger compartment are excluded. The idle travel occurring on actuation of the brake power booster is reduced. In the case of dual-circuit brake systems, a pressure differential in the brake circuits is prevented. In addition, the design allows for an adjustment of the increase of the pedal travel in the event of failure of one brake circuit.

It is a particularly important object of the present invention that a prefabricated unit including the booster, the brake pedal, the clutch pedal, and other components is put on the splash shield jointly with the facia panel through the door plate of the automotive vehicle under manufacture from the side of the interior space (passenger compartment) and is subsequently fastened by screws or bolts from the side of the engine compartment. It will be appreciated that such construction will foster manufacturing efficiency.

It is, then, another object of the present invention that the pedal be positioned as near as possible to the splash shield. On the other hand, the brake power booster projects as little as possible into the engine compartment.

According to the present invention, the forementioned objects are achieved by the combination of several features.

The pneumatic control valve of the brake power booster, preferably the vacuum control valve, is positioned at the side of the master cylinder of the brake power booster, in particular parallel to the master cylinder; the air serving as a boosting fluid, in particular the ambient air at atmospheric pressure, is conveyed from the engine compartment of the vehicle through the brake power booster into the booster's pneumatic pressure chamber or chambers; and the brake power booster carries at least one operating member of the vehicle, preferably the brake pedal.

In a further embodiment of the present invention, the brake power booster is designed so that it can be secured to the splash shield of the vehicle in the shape of one unit jointly with the operating member or members fastened to it, preferably together with the brake pedal, from the side of the interior space (passenger compartment) of the vehicle and can be subsequently screwed, bolted, or fixed by other means from the side of the engine compartment.

An extremely short design is achieved in that the master cylinder is formed in the shape of a twin cylinder assembly and in that an hydraulic equalizer piston-and-cylinder unit is provided for the pressure equalization between the two cylinders of the twin cylinder assembly.

In a further embodiment of the invention, the brake power booster is made a carrier element for the clutch pedal and for the clutch master cylinder.

Advantageously, the brake pedal and the clutch pedal are positioned side by side along parallel swivelling axes.

A space-saving solution is attained in that the stoplight switch is secured to the brake power booster, preferably to the pedal pedestal for the brake pedal being positioned at the brake power booster, and that the switch carries the brake warning device.

In a further embodiment of the present invention, an actuating element, in particular a lever element, is positioned between the dowel pin of the brake power booster and the closing member of the vacuum control valve. The actuating element moves the closing member, optimizes the adjustment of the idle travel of the closing member, and/or adjusts the jumper effect of the booster which is known in the prior art.

Furthermore, the booster housing has a housing section disposed on the side of the engine compartment and a cylinder section disposed on the side of the interior space. A guide member is provided for the atmosphere or for the compressed air which is preferably coupled to the housing section of the booster. The guide member can be formed by a tubular element which is sealingly coupled to the housing section by an atmosphere diaphragm. To reduce the cost of manufacture, the master cylinder is a shell of plastic material molded to the housing section, a guide element also made of plastic material serves as the atmosphere rolling diaphragm and is molded to the housing section, and the vacuum connection of the booster is made of plastic material and is molded to the housing section.

To fix the return springs for the pneumatic servo piston, the housing section is furnished with depressions which accommodate the return springs for the pneumatic servo piston. In particular, three return springs are provided which are arranged offset 120 angular degrees in respect of one another on a pitch circle.

In order to facilitate assembly by the vehicle manufacturer, the brake power booster is provided with one or with a plurality of brackets or flanges for fixation to the splash shield of the engine compartment.

In a preferred embodiment of the invention, a twin master cylinder is employed. According to that embodiment, the cylinder section of the brake power booster housing is formed with an elliptical opening presenting a guide surface and a stop for the control housing.

For efficiency of manufacture, a control housing rolling diaphragm carrier is pressed in a vacuum-tight manner in the cylinder section.

In order to ensure free movement of the brake pedal, the control housing rolling diaphragm carrier is furnished with a recess, in particular with a slot.

The centering between the control housing and the master cylinder is achieved in that the cylinder section and the housing section are each provided with a flange having a suitable configuration so as to allow positioning of the components with respect to each other.

In the same manner, the flanges of the cylinder section, on one side, and of the housing section, on the other side, are designed so as to center the cylinder section and the housing section with respect to each other before assembly and to allow subsequently a positive locking-type connection of the cylinder section and the housing section.

A further preferred embodiment provides that the "measure of opening K" between the disc-shaped valve closing member of the vacuum control valve and the valve seat of the vacuum control valve, which measure serves to reduce the idle travel, and the "measure Z", which serves to adjust the jumper effect as known in the prior art, are adjusted after abutment of the control housing against the cylinder section of the housing of the brake power booster, by setting the lever element on the cylinder section.

In this context, for example, a dowel pin is provided which is arranged to move in an oblong hole in the control housing. The oblong hole and the dowel pin constitute a limitation of travel on the actuating piston in the event of the release and of the actuation of the brake.

In a brake power booster which is equipped with a master cylinder being formed in the shape of a twin cylinder assembly, the vacuum-side end of the control housing made of plastic material is furnished with an oval bore to accommodate the twin cylinder assembly. The bore is reinforced by a metal ring, in particular by a steel ring, which absorbs bending forces originating, in particular, from the twin cylinder assembly and occurring in the event of failure of one cylinder of the twin cylinder assembly.

For the purpose of charging the booster, in a charged booster the atmosphere pipe is formed in the shape of a pneumatic pressure line.

Corresponding to the depressions in the housing section, depressions for accommodating the return springs are provided in the diaphragm retainer of the brake power booster. The depressions are arranged offset 120 angular degrees in respect of one another on a pitch circle.

An especially light-weight design is attained in that the twin cylinder assembly includes two plastic-coated cylinder bushings and a differential pressure piston unit being arranged above the cylinder bushings and at right angles to the cylinder bushings.

Hydraulic brake systems require a brake fluid intake device. In still another embodiment of the present invention, a brake fluid intake device has a central valve assembly. The brake fluid intake device is furnished with an intake cup being retained in a groove in the bottom of the master cylinder bore by a central valve housing, is provided with a round rod which projects into the connecting bore of the brake fluid reservoir and can be actuated from the outside to adjust the idle travel, is provided with a valve carrier which is pressed onto the round rod, is furnished with a valve body at least partly surrounding the valve carrier, and presents a threaded coupling element being antirotatingly and axially slidably accommodated in the master cylinder piston. The round rod is disposed so that it can be screwed into the threaded coupling element.

In a further embodiment, on the side of the passenger compartment of the vehicle, an outside housing section is disposed which at least partly surrounds the cylinder section of the booster housing, which is coupled to the booster housing in a positive locking fit, and to which a pedal pedestal is fixed.

The brake pedal, the clutch pedal, the stoplight switch and/or the clutch master cylinder are positioned at the pedal pedestal.

For a brake power booster whose pneumatic servo section is formed in a tandem-shape, the intermediate bottom of the tandem servo section is provided with a sealing ring and a stop for the control housing.

The intermediate bottom can also be furnished with a flange. The flanges of the intermediate bottom, of the cylinder section, and of the housing section of the booster housing are designed so as to allow centering during assembly and a subsequent positive locking-type coupling, for example, a beading. The control housing is provided with a duct through which the vacuum chamber of the brake power booster positioned on the side of the passenger compartment of the vehicle is evacuated.

In addition, the pressure chamber of the brake power booster positioned on the side of the passenger compartment of the vehicle is aerated through the recess or through the slot in which the lever element moves.

A plastic material component which abuts against the diaphragm retainer and which presents guide parts for the return spring positions the return spring for the diaphragm retainer.

The following advantages are achieved by the invention:

The objects set forth above are attained. A compact, space-saving device is provided to the automotive vehicle industry. In particular, the axial extension of the overall assembly is reduced to a considerable extent as compared to the state-of-the-art devices.

The present invention provides for an automatic assembly of the brake power booster, of the brake pedal, of the clutch pedal, and of the clutch master cylinder.

Further details of the present invention will be revealed by the following description of several embodiments of the invention.

BRIEF DESCRIPTION OF THE DRAWINGS

These embodiments will be explained with reference to fourteen Figures.

DETAILED DESCRIPTION OF THE INVENTION

The following description of the embodiments is based on a state of the art like that described, for example, in the Brake Handbook, 8th edition, by Alfred Teves GmbH, at pages 94 and following.

The descriptions and the drawings in the aforementioned Brake Handbook can be utilized for explanation of the starting basis of the invention and, thus, for the embodiments described in the following description.

The embodiments are substantially based on two concepts. The first concept is the combination of a vacuum brake power booster with a twin master cylinder. The second concept is the combination of a brake power booster with a conventional tandem master cylinder.

Figure 1:
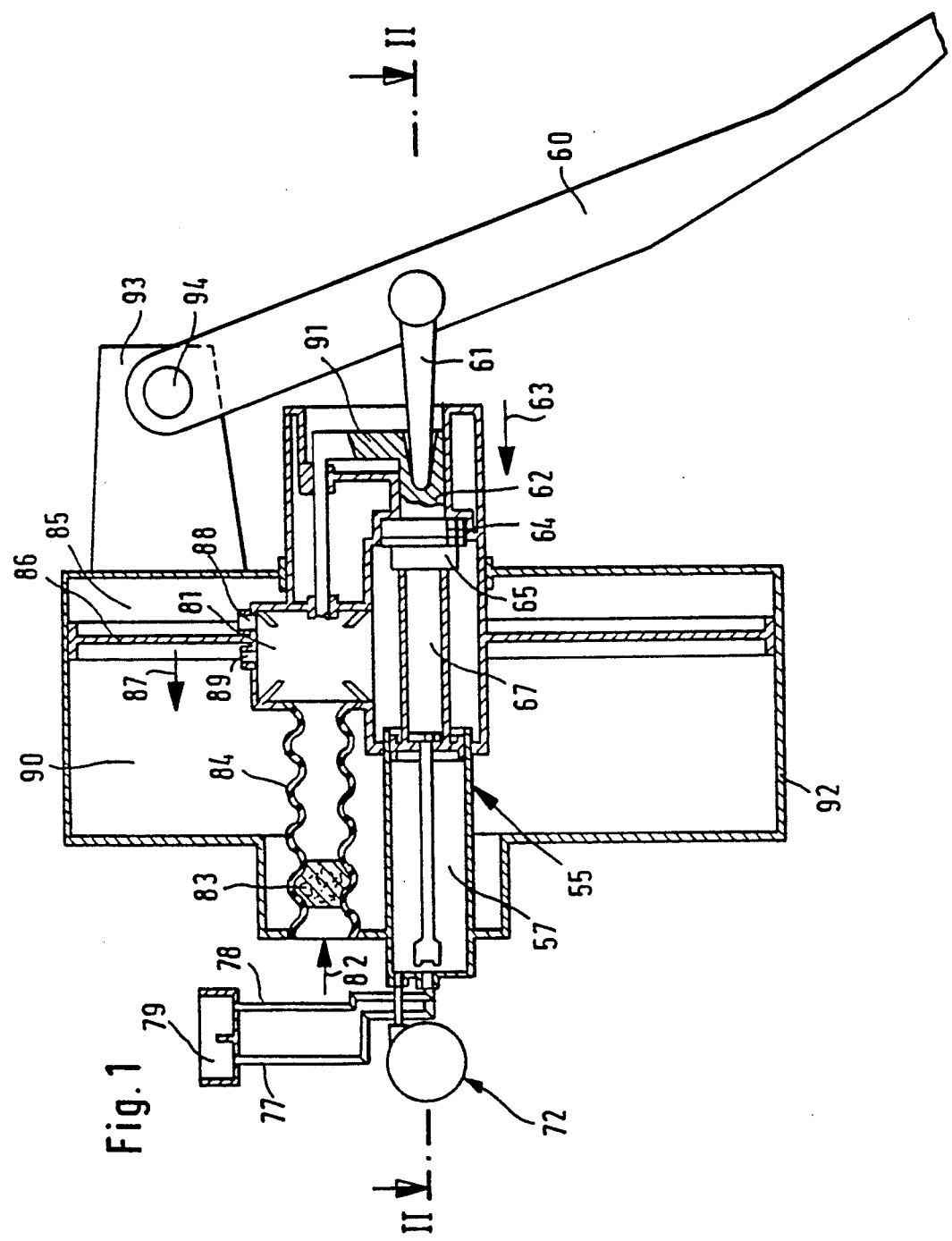
FIG. 1 shows a diagrammatic cross-sectional representation in radial direction of a vacuum brake power booster which is furnished with a twin master cylinder.
Figure 2:
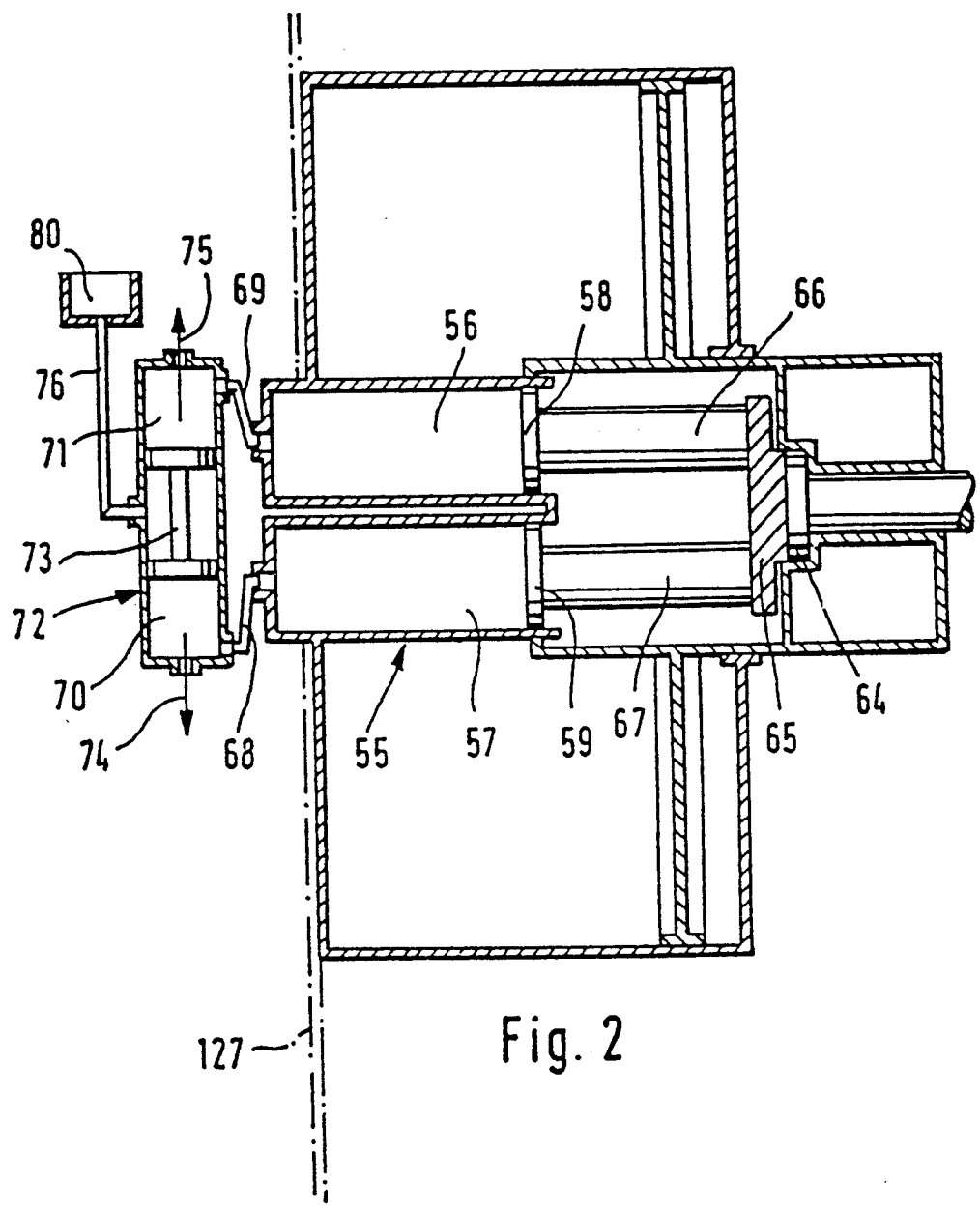
FIG. 2 shows the booster according to FIG. 11 in a cross-sectional representation along the line II/II in FIG. 1.

In FIGS. 1 and 2, the combination of a vacuum brake power booster with a twin master cylinder is shown. The twin master cylinder in its entirety bears the reference numeral 55. It is composed of two cylinder bores 56, 57 within which two pistons 58, 59 are accommodated. During actuation of the brake pedal 60, a force is exerted on the pressure plate 62 through the pressure member 61 in the direction of the arrow 63. The force is transmitted to the member 65 through the reaction disc 64, which is known (see the forementioned Brake Handbook). From the member 65, the pedal force is transmitted through the elements 66, 67 to the pistons 58, 59. Hydraulic pressure builds up in the cylinder bores 56, 57. The brake fluid flows through the ducts 68, 69 into the pressure chambers 70, 71 of the equalizer piston-and-cylinder unit.

The equalizer piston-and-cylinder unit is identified in its entirety by the reference numeral 72. The equalizer piston itself bears the reference numeral 73. From the pressure chambers 70, 71, the hydraulic fluid passes into the two actuating circuits 74, 75 for the brake unit of an automotive vehicle. It will be appreciated from the drawing that the discussion concerns a dual-circuit brake system. The equalizer piston-and-cylinder unit operates so that, in the event of a pressure drop in one circuit, an equalization is brought about by the slide of the equalizer piston.

Reference numerals 77, 78 in FIG. 1 and reference numeral 76 in FIG. 2 denote the lines going to the hydraulic fluid reservoirs 79, 80. FIG. 1 shows that the vacuum control valve 81 is arranged parallel to the master cylinder 55. The suction air which is at atmospheric pressure is aspirated from the engine compartment in the direction of the arrow 82. It is conveyed through the filter 83 and the tubular bellow 84 into the control valve 81.

Depending on the control action, the pressure chamber 85 is either aerated or evacuated as in the prior art (see the above-mentioned Brake Handbook). In the event of aeration, the plate steel servo piston 86 will slide to the left, in the direction of the arrow 87, boosting the manual effort which is exerted on the brake pedal. Reference numeral 88 denotes an opening through which the pressure chamber 85 is aerated. Evacuation of the vacuum chamber 90 takes place through the opening 89.

For further explanation, see the forementioned Brake Handbook.

Reference number 91 in FIG. 1 denotes a member which is moved by the brake pedal 60 and by the pressure member 61 and which actuates the vacuum control valve.

In the embodiment illustrated in FIGS. 1 and 2, a pedal pedestal 93 is secured to the housing 92 of the brake power booster. On that pedal pedestal the brake pedal 60 is pivoted. The pivot shaft is identified by reference numeral 94. The brake power booster together with the preassembled brake pedal is completely fitted together before incorporation in the vehicle. Subsequently, this assembly unit so fitted together will be moved against the splash shield 127 from the side of the passenger compartment, that is to say, from the side of the interior space of the vehicle, and will be screwed or bolted fast from the side of the engine compartment.

Figure 3:
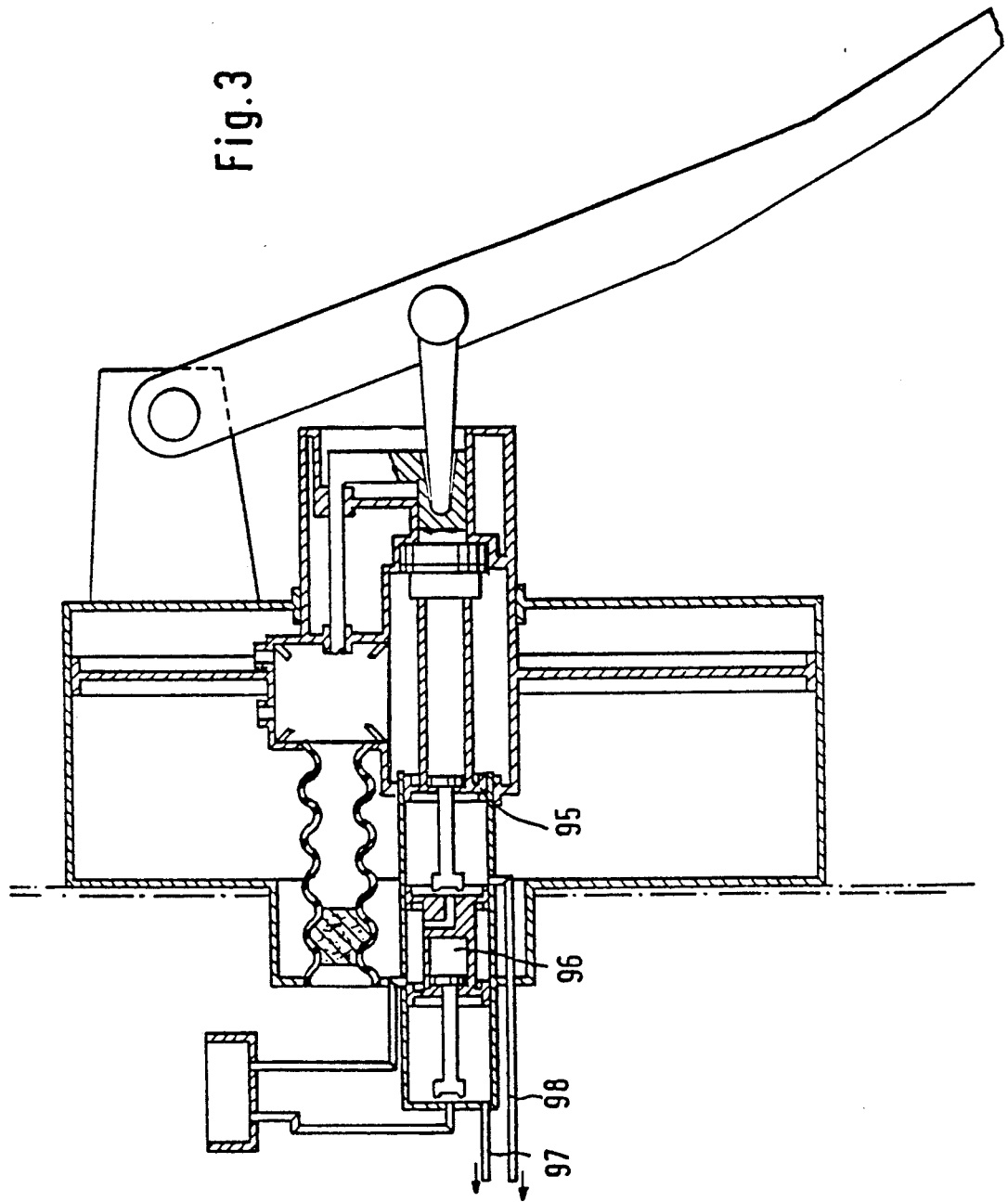
FIG. 3 shows diagrammatically, in a cross-sectional representation in radial direction, a vacuum brake power booster which is equipped with a conventional master cylinder.

FIG. 3 shows a brake power booster which is equipped with a conventional tandem master cylinder. The tandem master cylinder is furnished with a push rod piston 95 and with a floating piston 96. The two hydraulic actuating circuits for the wheel brakes are identified by the reference numerals 97, 98.

Figure 4:
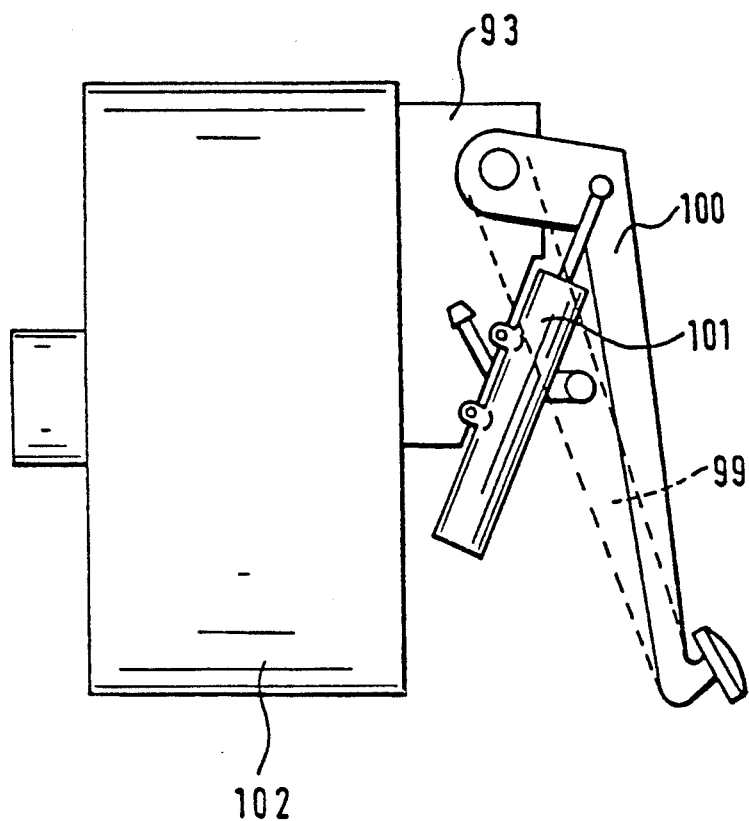
FIG. 4 shows the diagrammatic representation of a brake power booster as a carrier element for the brake pedal and for the clutch pedal.

FIG. 4 illustrates that the pedal pedestal 93 can perform multiple functions. On one hand, it serves as a carrier for the brake pedal 99 shown in dashed lines and for the clutch pedal 100 shown in continuous lines. In addition, the clutch master cylinder 101 is positioned at the pedal pedestal. The booster housing is identified by the reference numeral 102.

Figure 5:
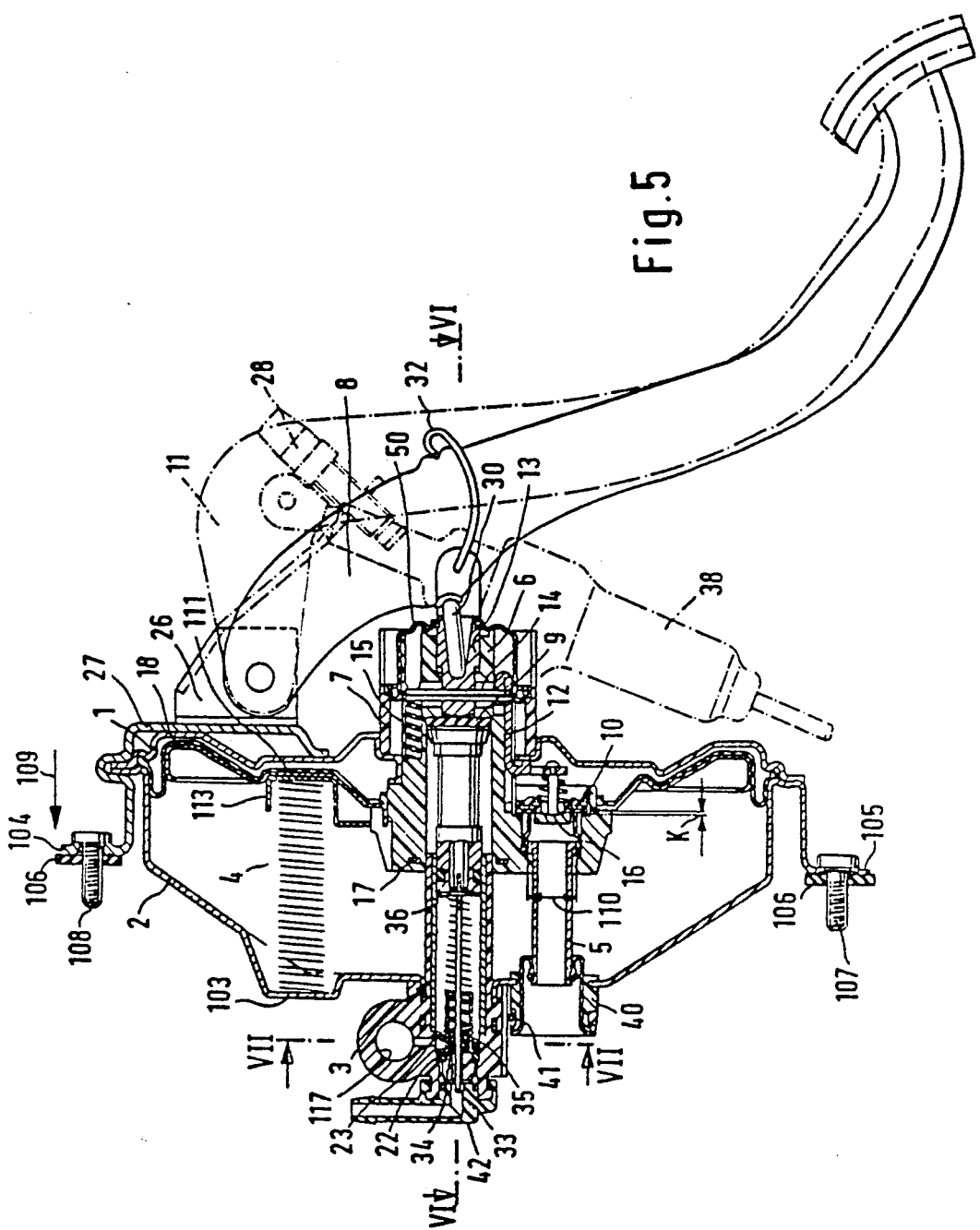
FIGS. 5 to 9 and 12 to 14 show further details of the brake power booster illustrated in FIGS. 1 and 3.
Figure 6:
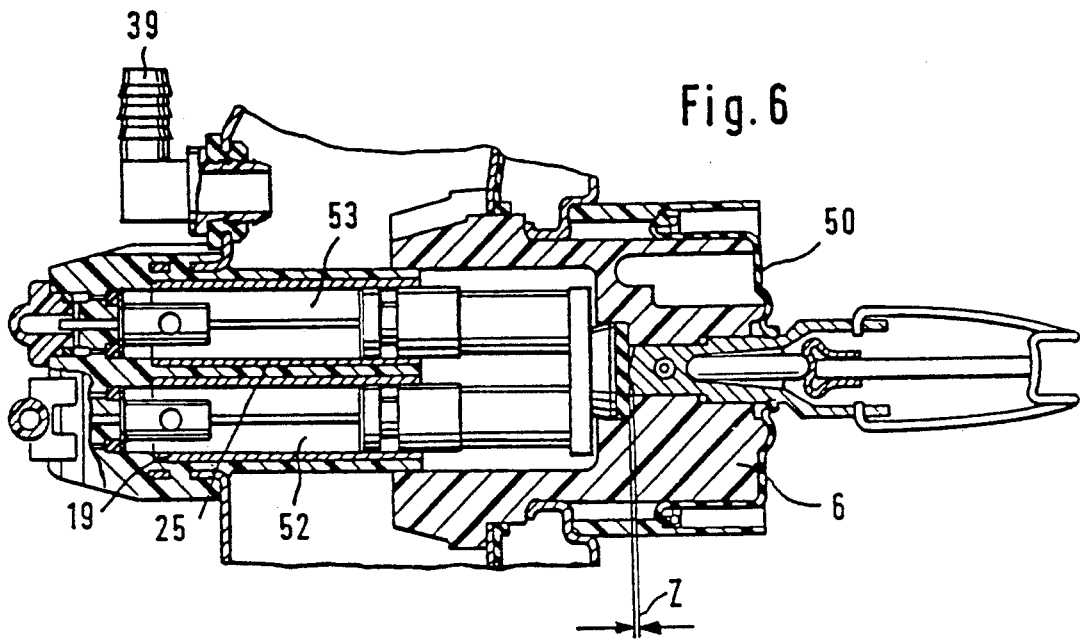
Figure 7:
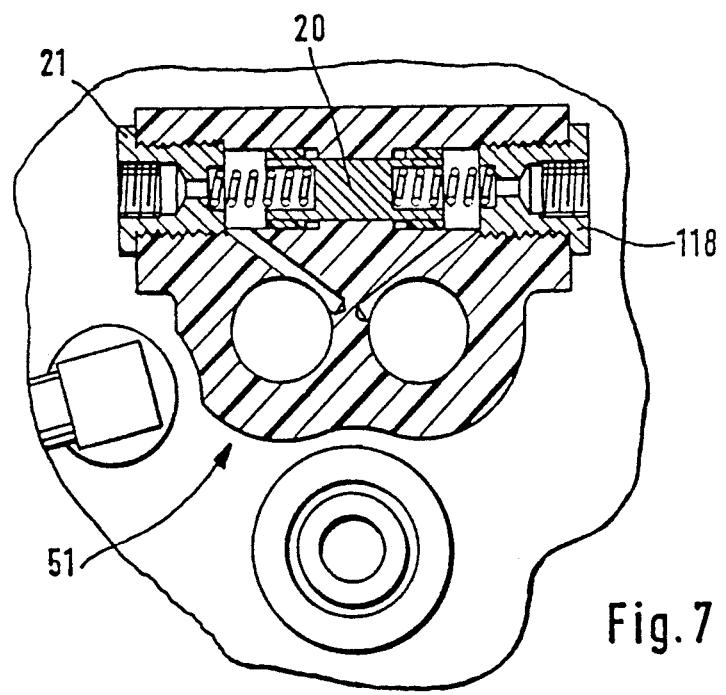

FIGS. 5 to 7 show details of a brake power booster which is equipped with a twin master cylinder.

Further details of this embodiment and of an embodiment with a conventional tandem master cylinder can be seen in FIGS. 9 and 12 to 14.

Figure 9:
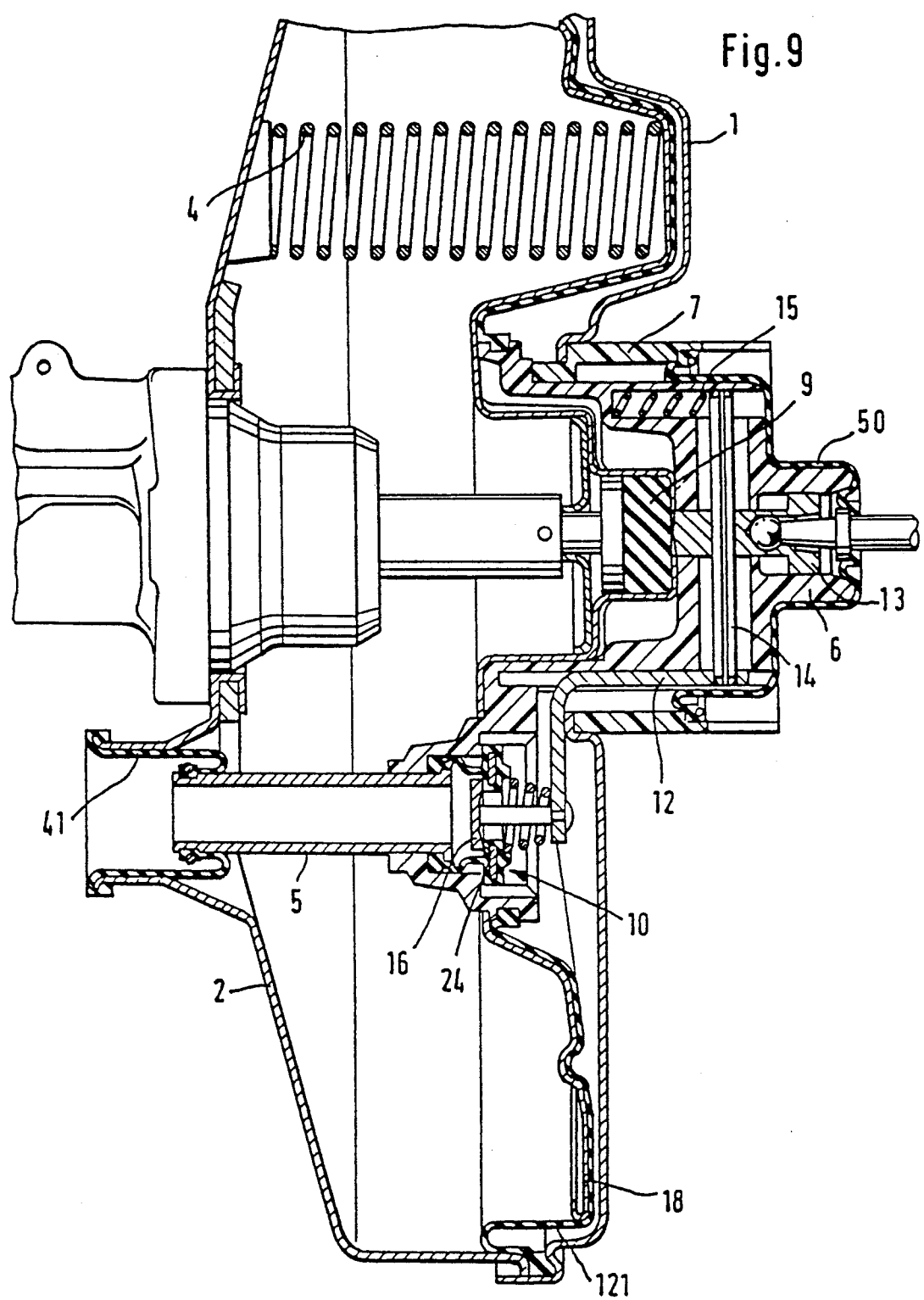
Figure 14:
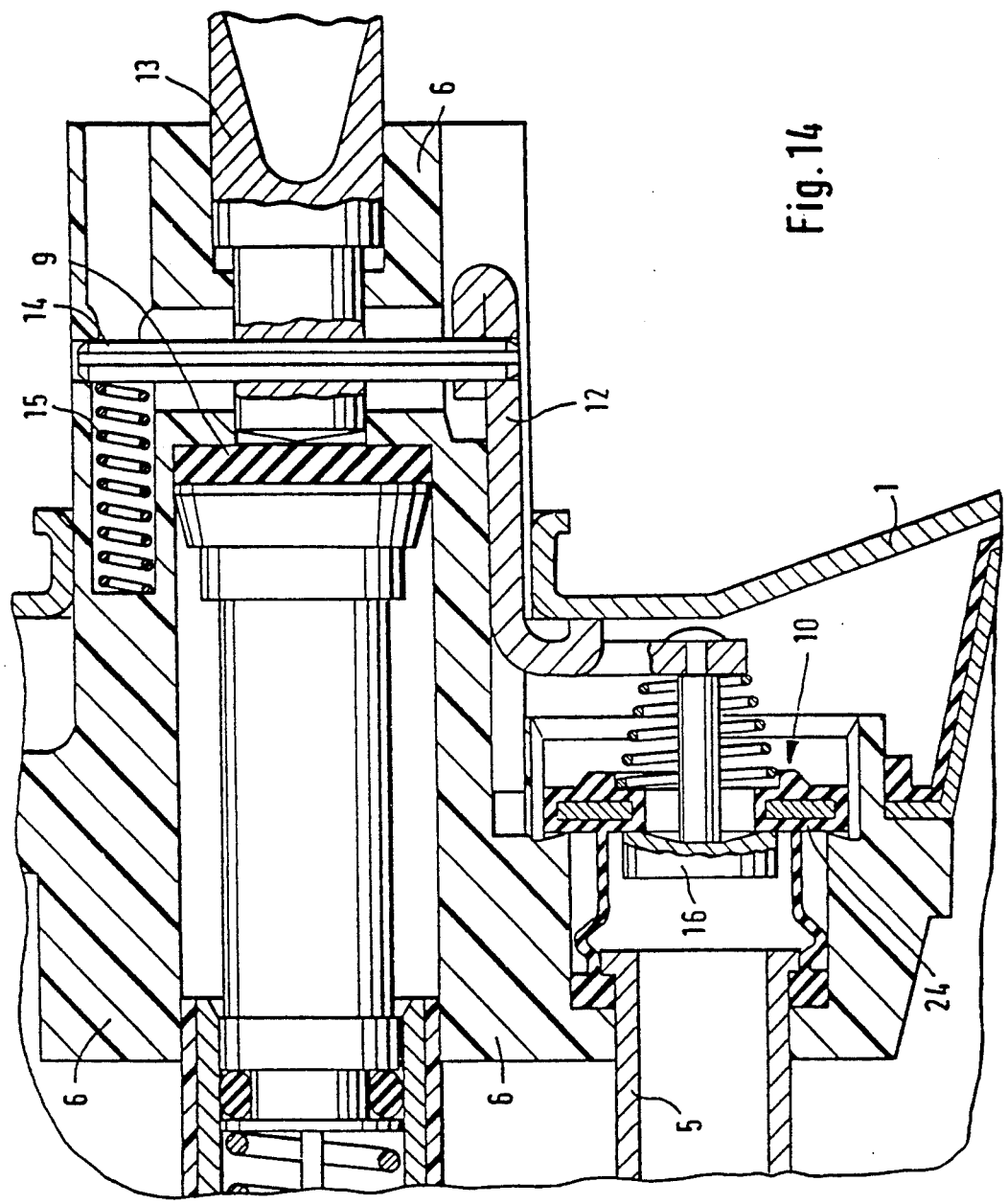

In FIGS. 9 and 14, particularly, details of the vacuum control valve are illustrated.

Figure 12:
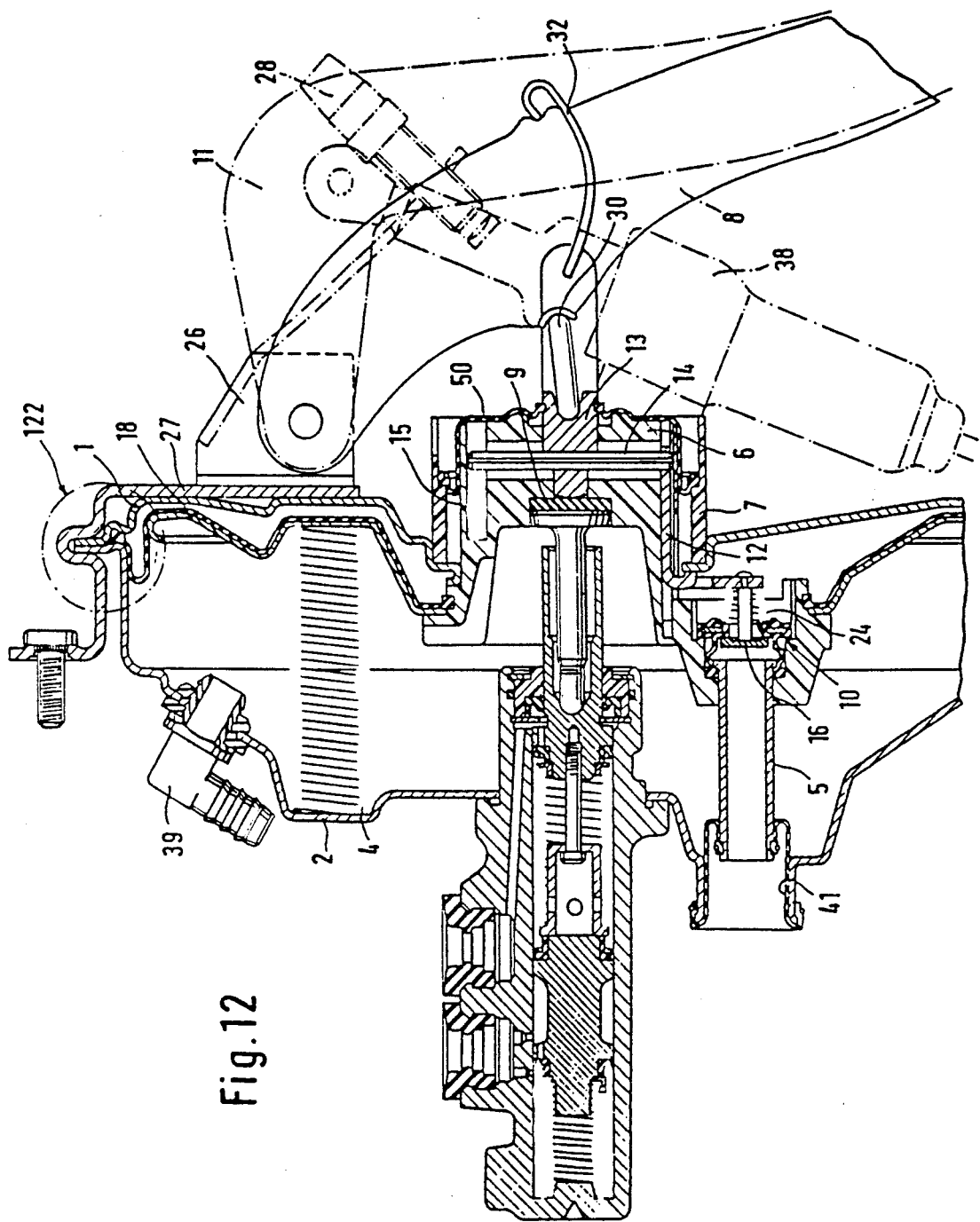

In FIG. 12, particularly, the configuration and the arrangement of the housing section and of the cylinder section of the booster housing and of an outside housing section are revealed.

Figure 13:
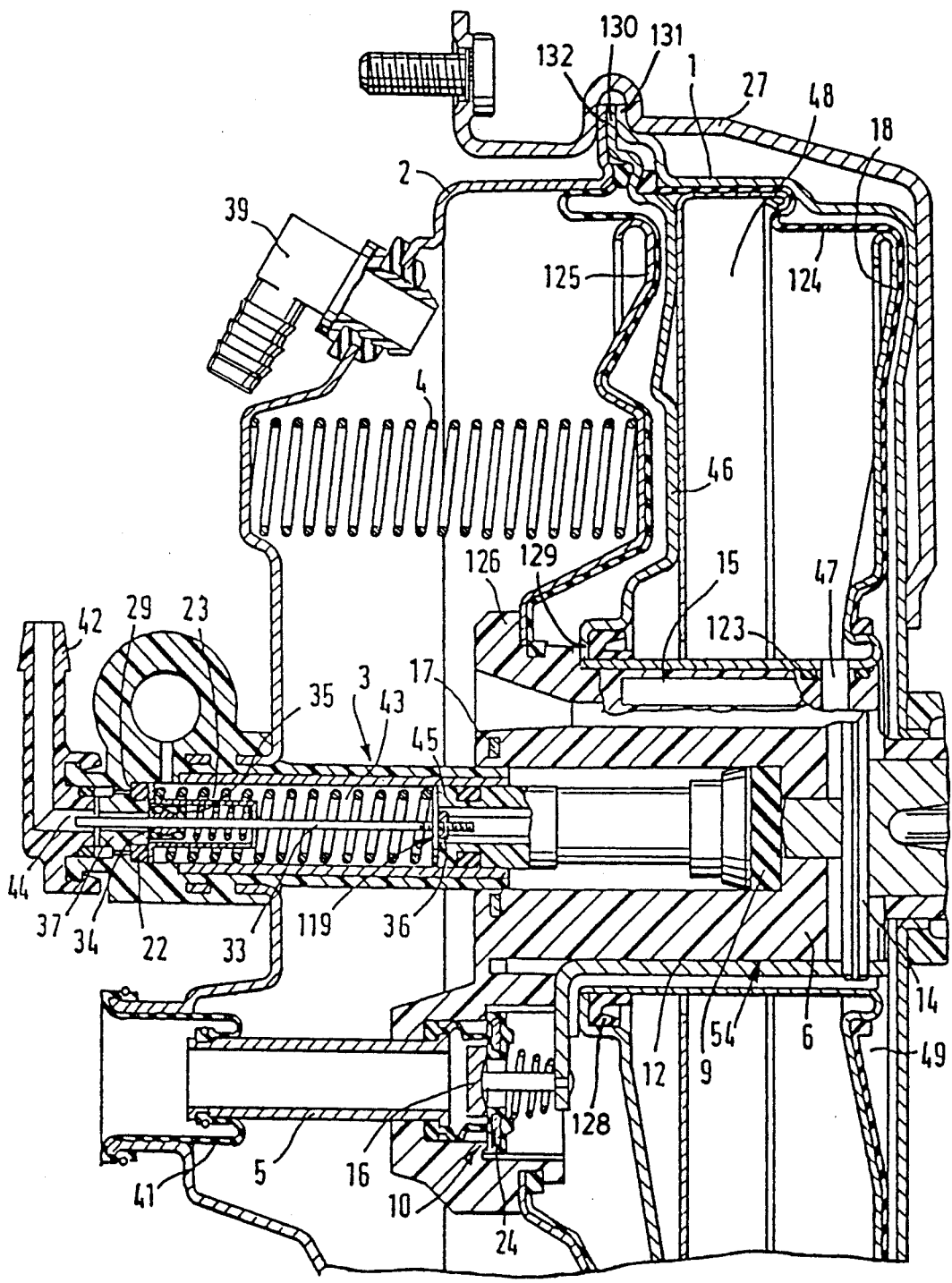

In FIG. 13, details of the central valve of the twin master cylinder are visible.

Figure 8:
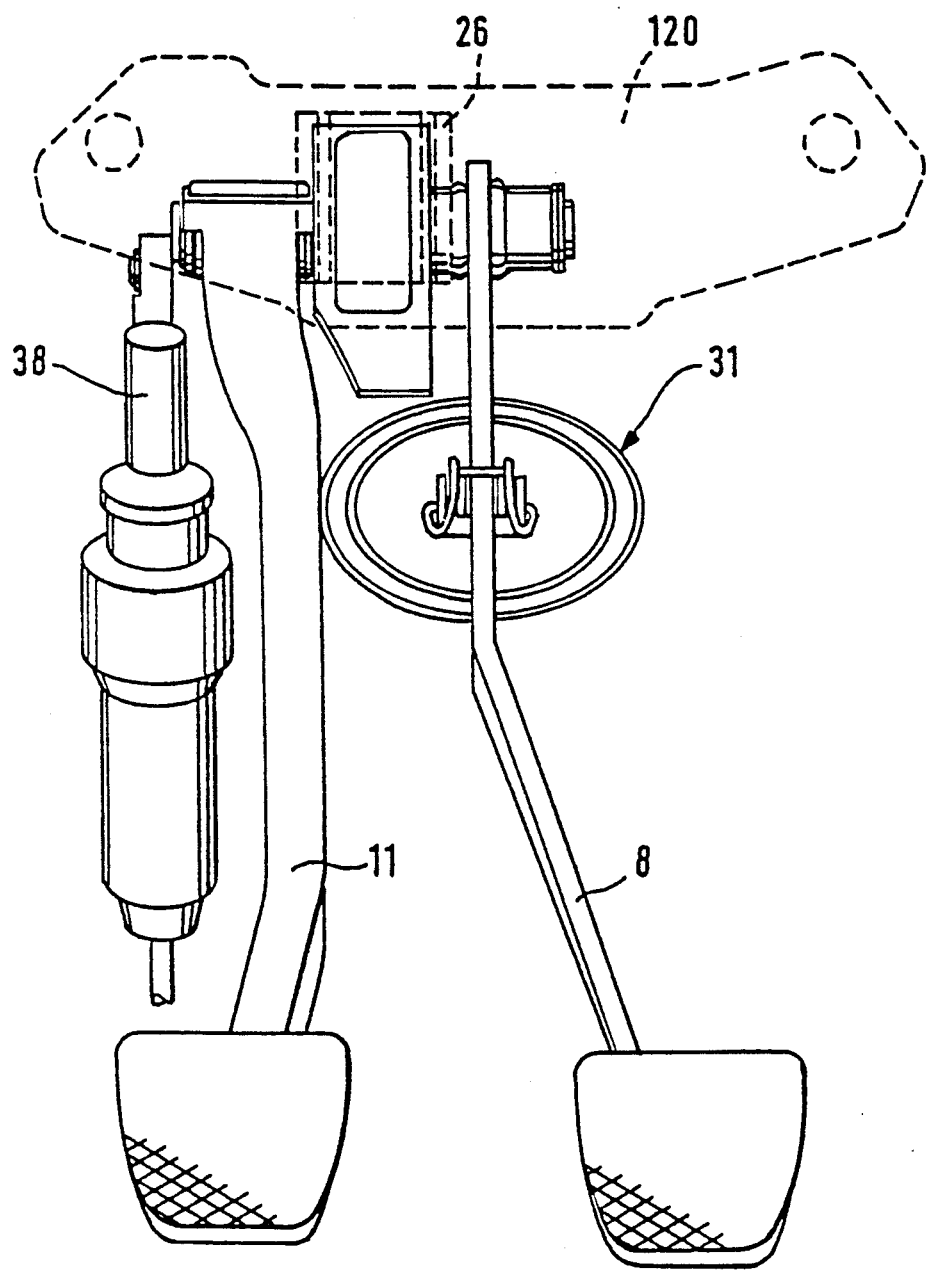

FIG. 8, discussed in more detail below, explains how the brake pedal and the clutch pedal pivot.

The booster housing of the embodiments shown in FIGS. 5 to 9 and 12 to 14 is composed of a housing section 2 and of a cylinder section I. In addition, an outside housing section 27 is provided. At the outside housing section, the pedal pedestal 26 is positioned. The brake pedal 8 (shown in continuous lines in FIG. 5) and the clutch pedal 11 (shown in dashed lines in FIG. 5) are pivoted on the pedal pedestal.

Furthermore, the master cylinder 38 of the clutch system is illustrated in FIG. 5. The twin master cylinder 3 and the guide 40 for the atmosphere diaphragm are molded to the housing section 2. The vacuum connection 39, too, is molded to the housing section (see FIG. 6).

The housing section is formed with three depressions which are offset 120 degrees, one of which being identified by reference numeral 103. These depressions serve to accommodate the return springs for the plate steel servo piston, specifically for the diaphragm retainer 18 of that servo piston.

The brake power booster is fixed to the splash shield 106 of the engine compartment through one or a plurality of brackets 104, 105 and by screw bolts 107, 108. The corresponding nuts are not illustrated.

The whole unit including the brake power booster with the master cylinder, the brake pedal, the clutch pedal, and the clutch master cylinder is prefabricated. From the side of the interior space of the vehicle, the unit is set on the splash shield, in the direction of the arrow 109, and subsequently screwed or bolted fast from the side of the engine compartment.

The cylinder section 1 is provided with an elliptical opening 31 (see FIG. 8), having a guide surface and a stop for the control housing. The control housing in its entirety bears reference numeral 6.

The rolling diaphragm carrier 7 is pressed in vacuum-tightly in the cylinder section 1. Rolling diaphragm carrier 7 has a recess, or a slot, in order to ensure the free movement of the brake pedal 8. The flange of the cylinder section and the flange of the housing section are designed in such a manner that a centering is achieved between the control housing 6 and the twin master cylinder 3 during the assembly of these two components. The assembly can be effected by a positive locking fit, for example by beading.

The control housing contains the reaction disc 9 as in the prior art and the vacuum control valve, also called the disc valve, which in its entirety bears the reference numeral 10. The vacuum control valve includes, among other elements, a disc-shaped valve closing member 16. The measure of opening K of the disc-shaped closing member 16 in respect of the valve seat 24 (see FIG. 9), and the measure called "measure Z" in booster technology and which is responsible for the known jumper effect of the booster, are realized upon the abutment of the control housing against the cylinder section and by setting the lever element 12 on the cylinder section.

The resetting forces acting on the actuating piston 13 are conveyed via the dowel pin 14 and the lever element 12 and are produced by the pedal return spring 15 and by the pneumatic pressure which acts on the cross section 110.

The dowel pin moves within the control housing in an oblong hole which simultaneously represents the limitation of travel of the actuating piston 13 at the moment of release and of actuation of the brake.

The disc shaped valve closing member 16 is coupled to the lever element 12 in a positive locking fit. The disc valve includes the disc-shaped valve closing member 16 and the valve seat 24 (see FIG. 9), and is clamped in the control housing pressure-tightly with the atmosphere pipe 5.

The atmosphere pipe can be utilized as a pneumatic pressure line if and when a brake power booster is employed which can be charged.

On the left-hand side of the control housing 6, near the vacuum, there is an oval bore in the control housing for accommodation of the twin master cylinder. This bore is reinforced by a steel ring 17. The steel ring absorbs forces which are exerted on the control housing by the twin master cylinder, particularly when one pressure chamber of the twin master cylinder experiences a pressure failure due to a defect.

The diaphragm retainer is positioned on a circumferential recess in the control housing and is fixed at a plurality of points. The diaphragm retainer 18 is formed with three depressions being offset by 120 degrees and serving the return springs. One depression can be seen in FIG. 5 and bears the reference numeral 111. The associated return spring is identified by reference numeral 4. The matching depression of the housing section 2 bears the reference numeral 103.

Figure 11:
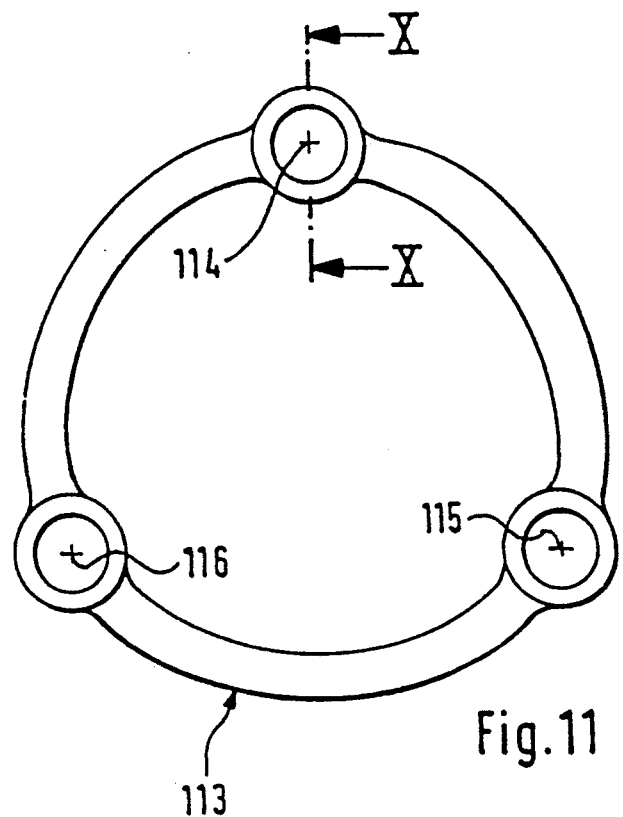
FIGS. 10 and 11 show a positioning device for return springs of the diaphragm retainer.
Figure 10:
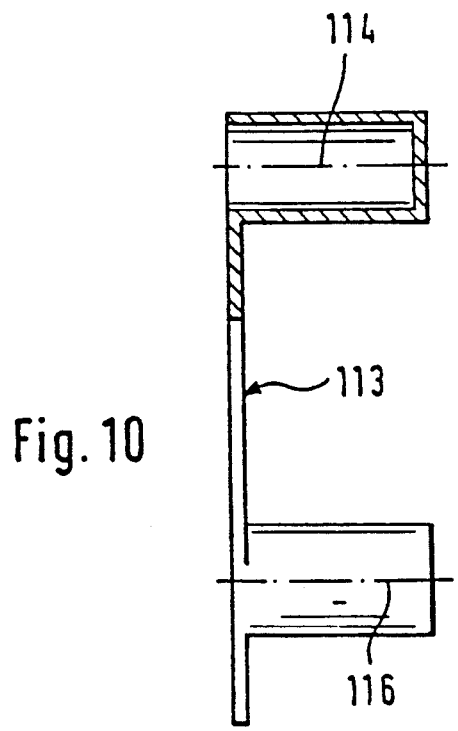

The three return springs are fixed by a plastic component. The plastic component is illustrated in FIGS. 5, 10 and 11 and bears the reference numeral 113. It can be gathered from the shape of the plastic component that along the axes 114, 115, 116 the return springs 4 are positioned.

FIG. 10 shows a lateral view in partial section along the line X/X in FIG. 11. FIG. 11 shows a top view.

FIGS. 5, 6 and 7 show, among other things, details of the twin master cylinder. FIG. 6 is a sectional representation along the line VI/VI in FIG. 5. FIG. 7 is a sectional representation along the line VII/VII in FIG. 5.

The twin master cylinder includes two coated cylinder bushings which are identified by reference numerals 19, 25 in FIG. 6. Perpendicularly above the twin master cylinder the bore 117 for the differential pressure piston 20 (see FIG. 7) is arranged, which is closed by two connection thread screws 21, 118.

For the twin master cylinder, a brake fluid intake device is employed which has a central valve as illustrated in more detail in FIG. 13.

The intake device has an intake cup 22. Cup 22 is seated in a groove 29 in the cylinder bottom 37 and is retained there by the central valve housing 23. The round rod 33 of the central valve projects into the reservoir connecting bore 44. In this manner, the idle travel of the central valve can be adjusted from the outside by turning the round rod. The central valve further includes a valve carrier which is pressed onto the round rod 33. The valve carrier 34 is surrounded by a valve body 35.

A threaded coupling element 36 is positioned in each piston of the twin master cylinder. Element 36 will not rotate but will slide in the axial direction. The round rod is threaded into the threaded coupling element, so that the threaded coupling element is moved in the axial direction by rotating the round rod. In this way, an adjustment of the idle travel is feasible when the device is already assembled. Reference numeral 119 denotes a stop for the threaded coupling element. The stop is connected to the piston of the master cylinder. When the piston is moved to the right (release of the brake), the central valve will open, which lifts the valve body 35 so that brake fluid may be taken in.

The brake fluid reservoir connecting nozzle 42 is fixed to the twin master cylinder. A reservoir monitoring device may be incorporated at this point.

It is possible instead of the twin master cylinder to combine a conventional tandem master cylinder with the brake power booster.

As already mentioned above, the pedal pedestal 26 is coupled onto an outside housing section 27. Outside housing section 27 partly surrounds the booster housing. The outside housing section is furnished with brackets to fix the brake power booster to the splash shield of the engine compartment.

As mentioned above, the pedal pedestal can be utilized universally. It may be designed so as to carry the stoplight switch 28 and the clutch master cylinder 38 (see FIG. 5). Alternatively, the clutch master cylinder 38 may be fixed directly to the cylinder section 1 of the brake power booster by a retaining plate which is not illustrated.

Through a pressure plate 30, the brake pedal is coupled to the actuating piston 13 free of play owing to a spring 32.

FIG. 8 shows the pedal assembly in a view from the side of the passenger compartment of the vehicle in the direction of the splash shield. The pedal assembly includes the brake pedal 8 and the clutch pedal 11, which acts on the clutch master cylinder 38. The oval shape of the control housing is identified by the reference numeral 31. The pedal pedestal projecting upward from the drawing plane is marked out in dashed lines and identified by the reference numeral 26. It is fixed on a plate which, too, is shown in a dashed line and which bears the reference numeral 120. The plate itself is coupled to the outside housing section 27 of the brake power booster.

FIGS. 9 and 14 show the essential components of the brake power booster, in particular the vacuum control valve, in a scaled-up representation. In these Figures, reference numerals identical to those in FIGS. 5 to 8 are used for identical components, so that reference may be made to the description of those Figures.

In FIG. 9, the control housing 6 is shown in cross-section. The cross-sectional area is shown coarsely cross-hatched. The rolling diaphragm carrier 7, too, is shown in a cross-sectional view and is finely cross-hatched. The lever element 12 is marked out hatched.

The dowel pin 14 is connected through the lever element 12 to the disc-shaped valve closing member 16 of the vacuum control valve 10. Reference numeral 121 denotes the rolling diaphragm of the pneumatic servo piston, and of the diaphragm retainer 18. The housing section is identified by the reference numeral 2, the cylinder section by the reference numeral 1. The control housing is sealed by the rolling diaphragm 50. Sealing of the pipe 5 is made by the rolling diaphragm 41.

From FIG. 14, in particular, the set-up and the mode of functioning of the vacuum control valve can be seen as have been described in the foregoing. The entirety of the vacuum control valve is identified by the reference numeral 10. The lever element bears the reference numeral 12. The dowel pin bears the reference numeral 14. The reference numeral 6 denoting the housing of the control valve is repeated several times in FIG. 14 in order to make sure that the configuration of the housing 6 is clear. The housing 6, too, is shown cross-hatched in FIG. 14.

The brake power booster shown in FIG. 12 is equipped with a conventional tandem master cylinder.

The components shown in FIG. 12 which have been described in connection with FIGS. 5 to 8 bear reference numerals identical to those used in these latter Figures.

As is visible in FIG. 12, in addition to the housing section 2 and to the cylinder section 1, an outside housing section 27 is provided. On the outside housing section 27 the pedal pedestal 26 is fixed.

In the area 122 the outside housing section and the flanges of the housing section and of the cylinder section are connected to one another in a positive locking fit.

In FIG. 13 an embodiment of the brake power booster is shown in which the tandem design of the vacuum servo section is employed. The tandem design is state of the art. See the aforementioned Brake Handbook for further relevant explanation.

The particular features of the embodiment in accordance with FIG. 13 will be described in the following:

The evacuation of the chamber 48, arranged between the diaphragm retainer 18 and the intermediate bottom 46, occurs through a duct 47 in the control housing 6. Duct 47 is sealed at the diaphragm retainer by a sealing element 123. Intermediate bottom 46 has a sealing ring 128 and a radial collar 129 which forms a stop for control housing 6.

The chamber 49, which is arranged between the diaphragm retainer 18 and the rolling diaphragm 124 of the diaphragm retainer, on one side, and the cylinder section 1 of the booster housing, on the other side, is aerated by the slot 54 in which the lever 12 is positioned.

Aeration means, in this case, building up the atmospheric pressure in the chamber 49 and starting the servo action of the brake power booster. Evacuation means drawing a vacuum.

The diaphragm retainer 125, which is arranged on the side of the engine compartment, is seated on a circumferential recess 126 of the control housing. The diaphragm retainer is fixed to the recess at a plurality of points.

The flange 130 of intermediate bottom 46, the flange 131 of cylinder section 1, and the flange 132 of housing section 2 of the booster housing are designed so as to allow centering during assembly and a subsequent positive locking-type coupling, for example, a beading.

We claim:

1. A pneumatic brake power booster for an automotive vehicle having an engine compartment, said booster comprising:
   a booster housing;
   a pneumatic pressure chamber unit within said booster housing;
   a master cylinder within said booster housing;
   a pneumatic control valve within said booster housing positioned adjacent said master cylinder and disposed parallel to said master cylinder, said pneumatic control valve having a diaphragm retainer with a plurality of return springs and a component abutting said diaphragm retainer and positioning said return spring; and
   means for supplying ambient air at atmospheric pressure from the engine compartment of the vehicle to said pneumatic pressure chamber unit.

2. A pneumatic brake power booster for an automotive vehicle having an engine compartment and at least one operating member, said booster comprising:
   a booster housing;
   a pneumatic pressure chamber unit within said booster housing;
   a master cylinder within said booster housing;
   a pneumatic control valve within said booster housing having a diaphragm retainer with a plurality of return springs and a component abutting said diaphragm retainer and positioning said return springs;
   means for supplying ambient air at atmospheric pressure from the engine compartment of the vehicle to said pneumatic pressure chamber unit; and
   means for mounting the at least one operating member of the vehicle.

3. A pneumatic brake power booster for an automotive vehicle having at least one operating member, said booster comprising:
   a booster housing;
   a pneumatic pressure chamber unit within said booster housing;
   a master cylinder within said booster housing;
   a pneumatic control valve within said booster housing positioned adjacent said master cylinder and disposed parallel to said master cylinder, said pneumatic control valve having a diaphragm retainer with a plurality of return springs and a component abutting said diaphragm retainer and positioning said return spring; and
   means for mounting the at least one operating member of the vehicle.

4. A pneumatic brake power booster as claimed in claim 3 wherein the vehicle further comprises an engine compartment and said brake power booster further comprises means for supplying ambient air at atmospheric pressure from the engine compartment of the vehicle to said pneumatic pressure chamber unit.

5. A pneumatic brake power booster as claimed in claim 4 wherein said operating member is a brake pedal.

6. A pneumatic brake power booster as claimed in claim 5 wherein the vehicle has a pedal pedestal on which said brake pedal pivots and a stoplight switch is secured and said mounting means include means for positioning said pedal pedestal on said brake power booster.

7. A pneumatic brake power booster as claimed in claim 6 wherein the vehicle has a clutch pedal and a clutch master cylinder which are positioned on said pedal pedestal.

8. A pneumatic brake power booster as claimed in claim 7 wherein the brake pedal and the clutch pedal of said vehicle are swivelable about a common axis and disposed alongside each other.

9. A pneumatic brake power booster as claimed in claim 4 wherein the engine compartment of the vehicle has a splash shield and said brake power booster further includes means for attaching said brake power booster to said splash shield.

10. A pneumatic brake power booster as claimed in claim 9 wherein the vehicle has a passenger compartment and said attaching means attach said brake power booster to said splash shield from the side of said splash shield facing the passenger compartment of the vehicle.

11. A pneumatic brake power booster as claimed in claim 10 wherein said attaching means comprises at least one flange.

12. A pneumatic brake power booster as claimed in claim 4 wherein said pneumatic control valve has a housing and said brake power booster further comprises means for sealing said housing of said pneumatic control valve to said booster housing.

13. A pneumatic brake power booster as claimed in claim 12 wherein said sealing means include a rolling diaphragm element.

14. A pneumatic brake power booster as claimed in claim 12 further comprising a metal ring and wherein:
   said master cylinder is a twin cylinder assembly;
   said control valve housing has a plastic vacuum-side end having an oval bore for accommodating said twin cylinder assembly; and
   said metal ring reinforces said bore.

15. A pneumatic brake power booster as claimed in claim 14 wherein said twin cylinder assembly includes two plastic-coated cylinder bushings and a differential pressure piston unit arranged above and perpendicular to said cylinder bushings.

16. A pneumatic brake power booster as claimed in claim 12 further comprising a pneumatic servo section formed as a tandem shape and having an intermediate bottom which includes a sealing ring and a stop for said control valve housing.

17. A pneumatic brake power booster as claimed in claim 16 further comprising a vacuum chamber positioned on the passenger compartment side of said brake power booster and wherein said control valve housing has a duct for evacuating said vacuum chamber.

18. A pneumatic brake power booster as claimed in claim 16 further comprising an actuating element and a pressure chamber positioned on the passenger compartment side of said brake power booster and wherein said control housing has a slot through which said pressure chamber aerates and within which said actuating element is movable.

19. A pneumatic brake power booster as claimed in claim 12 wherein:
   the vehicle has a passenger compartment;
   said booster housing includes a housing section arranged on the side of said booster housing facing the engine compartment and a cylinder section arranged on the side of said booster housing facing the passenger compartment; and said means for supplying the air from the engine compartment of said vehicle to said brake power booster includes a tubular element and an atmosphere rolling diaphragm which sealingly couples said tubular element to said housing section of said booster housing.

20. A pneumatic brake power booster as claimed in claim 19 wherein said master cylinder has a plastic shell molded to said housing section of said booster housing.

21. A pneumatic brake power booster as claimed in claim 19 wherein said means for supplying the air from said engine compartment of the vehicle to said brake power booster further include a plastic guide element molded to said housing section of said booster housing for guiding said atmosphere rolling diaphragm.

22. A pneumatic brake power booster as claimed in claim 19 further comprising a plastic vacuum connection molded to said housing section of said booster housing.

23. A pneumatic brake power booster as claimed in claim 19 further comprising a pneumatic servo piston and three return springs engaging said pneumatic servo piston, said return springs being arranged offset 120 angular degrees, on a pitched circle and said housing section of said booster housing having depressions for accommodating said return springs.

24. A pneumatic brake power booster as claimed in claim 23 wherein said depressions in said housing section of said booster housing for accommodating said return springs are arranged offset 120 angular degrees on a pitched circle.

25. A pneumatic brake power booster as claimed in claim 19 wherein said master cylinder is a twin cylinder assembly and said cylinder section of said booster housing has an elliptical opening presenting a guide surface and a stop for said control valve housing.

26. A pneumatic brake power booster as claimed in claim 19 wherein said control valve housing has a rolling diaphragm carrier pressed in a vacuum-tight manner in said cylinder section of said booster housing.

27. A pneumatic brake power booster as claimed in claim 26 wherein the vehicle has a brake pedal and said rolling diaphragm carrier of said control valve housing has a slot to ensure free movement of the brake pedal of said vehicle.

28. A pneumatic brake power booster as claimed in claim 19 wherein said cylinder section of said booster housing has a flange and said housing section of said booster housing has a flange and said flanges center said control valve housing with respect to said master cylinder.

29. A pneumatic brake power booster as claimed in claim 28 wherein said flange of said cylinder section of said booster housing and said flange of said housing section of said booster housing center said cylinder section and said housing section relative to each other and permit a locking-type connection between said cylinder section and said housing section.

30. A pneumatic brake power booster as claimed in claim 28 further comprising a pneumatic servo section formed as a tandem shape and having an intermediate bottom, said intermediate bottom including a flange, wherein said flanges of said intermediate bottom, said cylinder section, and said housing section are adapted to permit centering and a lock-type coupling during assembly.

31. A pneumatic brake power booster as claimed in claim 19 wherein said tubular element is a pneumatic pressure line for charging said brake power booster.

32. A pneumatic brake power booster as claimed in claim 4 wherein said master cylinder is a twin cylinder assembly and further comprises means for equalizing the pressure between the two cylinders of said twin cylinder assembly.

33. A pneumatic brake power booster as claimed in claim 4 wherein said operating members are a clutch pedal and a clutch master cylinder.

34. A pneumatic brake power booster as claimed in claim 4 wherein said operating member is a carrier member for a brake warning device.

35. A pneumatic brake power booster as claimed in claim 4 wherein said master cylinder has a piston and said vehicle further comprises a brake fluid reservoir having a connecting bore and a brake fluid intake device having:

a central valve assembly including a housing;

an intake cup retained in a groove in the bottom of a bore in said master cylinder by said housing of said central valve assembly;

a non-rotatable threaded coupling element axially slidable within the piston of said master cylinder;

an externally actuable round rod projecting into the connecting bore in the brake fluid reservoir and screwed into said threaded coupling element;

a valve carrier pressed onto said round rod; and a valve body at least partly surrounding said valve carrier.

36. A pneumatic brake power booster as claimed in claim 4 wherein said vehicle has a passenger compartment and an outside housing section to which said booster housing is coupled and said booster housing has a cylinder section at least partly surrounded by said outside housing section housing.

37. A pneumatic brake power booster as claimed in claim 36 wherein the vehicle has a pedal pedestal and said pedal pedestal is fixed to said outside housing section.

38. A pneumatic brake power booster as claimed in claim 4 wherein said pneumatic control valve has a closing element and said brake power booster further comprises means for moving said closing element to adjust said brake power booster, said means including a dowel pin and an actuating element positioned between said dowel pin and said closing element of said pneumatic control valve.

39. A pneumatic brake power booster as claimed in claim 38 wherein:

said pneumatic control valve has a housing;

the vehicle has a passenger compartment; and said booster housing includes a housing section arranged on the side of said booster housing facing the engine compartment and a cylinder section arranged on the side of said booster housing facing the passenger compartment.

40. A pneumatic brake power booster as claimed in claim 39 wherein said pneumatic control valve includes a valve seat and the "measure of opening K" between said valve closing element and said valve seat of said pneumatic control valve and the "measure Z" are adjustable after abutment of said control valve housing against said cylinder section of said booster housing by setting said actuating element on said cylinder section.

41. A pneumatic brake power booster as claimed in claim 40 wherein the vehicle has a brake, said brake power booster further includes an actuating piston and said control valve housing has an oblong hole within which said dowel pin is movable to limit travel of said actuating piston upon release and actuation of the brake of said vehicle.

42. A pneumatic brake power booster for an automotive vehicle, said booster comprising:
   a booster housing;
   a pneumatic pressure chamber unit within said booster housing;
   a master cylinder formed as a twin cylinder assembly within said booster housing;
   a pneumatic control valve having a housing sealed to and positioned within said booster housing, said control valve housing having a plastic vacuum-side end having an oval bore for accommodating said twin cylinder assembly; and
   a metal ring reinforcing said bore.

43. A pneumatic brake power booster for an automotive vehicle, said booster comprising:
   a booster housing;
   a pneumatic pressure chamber unit within said booster housing;
   a master cylinder within said booster housing;
   a pneumatic control valve having a housing sealed to and positioned within said booster housing; and
   a pneumatic servo section formed as a tandem shape and having an intermediate bottom which includes a sealing ring and a stop for said control valve housing.

44. A pneumatic brake power booster for an automotive vehicle having a brake fluid reservoir with a connecting bore, said booster comprising:
   a pneumatic pressure chamber unit within said booster housing;
   a master cylinder within said booster housing having a piston;
   a brake fluid intake device having:
      (a) a central valve assembly including a housing,
      (b) An intake cup retained in a groove in the bottom of a bore in said master cylinder by said housing of said central valve assembly,
      (c) a non-rotatable threaded coupling element axially slidable within the piston of said master cylinder,
      (d) an externally actuable round rod projecting into the connecting bore in the brake fluid reservoir and screwed into said threaded coupling element,
      (e) a valve carrier pressed onto said round rod, and
      (f) a valve body at least partly surrounding said valve carrier; and
   a pneumatic control valve within said booster housing.

45. A pneumatic brake power booster for an automotive vehicle having a passenger compartment, an outside housing sections and a pedal pedestal fixed to the outside housing section and mounting at least one operating member, said booster comprising:
   a booster housing coupled to said outside housing section and having a cylinder section at least partly surrounded by said outside housing section;
   a pneumatic pressure chamber unit within said booster housing;
   a master cylinder within said booster housing; and
   a pneumatic control valve within said booster housing having a diaphragm retainer with a plurality of return springs and a component abutting said diaphragm retainer and positioning said return springs.

46. A pneumatic brake power booster for an automotive vehicle, said booster comprising:
   a booster housing;
   a pneumatic pressure chamber unit within said booster housing;
   a master cylinder within said booster housing;
   a pneumatic control valve within said booster housing;
   a diaphragm retainer having a plurality of return springs; and
   a ring-shaped plastic component abutting said diaphragm retainer and positioning said return springs.

* * * * *